(12) United States Patent
Rajauria et al.

(10) Patent No.: US 10,699,736 B1
(45) Date of Patent: Jun. 30, 2020

(54) DATA STORAGE DEVICE DETECTING ABNORMALITY WITH A WRITE ASSIST ELEMENT BASED ON SLOPE OF PROTRUSION

(71) Applicant: Western Digital Technologies, Inc., San Jose, CA (US)

(72) Inventors: Sukumar Rajauria, San Jose, CA (US); Erhard Schreck, San Jose, CA (US); Harold H. Gee, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/518,918

(22) Filed: Jul. 22, 2019

(51) Int. Cl.
*G11B 11/00* (2006.01)
*G11B 5/58* (2006.01)
*G11B 5/31* (2006.01)

(52) U.S. Cl.
CPC ............. *G11B 5/58* (2013.01); *G11B 5/3136* (2013.01)

(58) Field of Classification Search
None
See application file for complete search history.

(56) References Cited

U.S. PATENT DOCUMENTS

| 8,077,418 | B1* | 12/2011 | Hu | G11B 5/3136 |
| | | | | 29/603.07 |
| 8,804,272 | B1* | 8/2014 | Dakroub | G11B 5/6005 |
| | | | | 360/46 |
| 8,873,353 | B1* | 10/2014 | Riddering | G11B 5/314 |
| | | | | 369/13.33 |
| 8,897,104 | B1* | 11/2014 | Yan | G11B 5/314 |
| | | | | 369/112.27 |
| 8,908,483 | B1 | 12/2014 | Ren et al. | |
| 9,336,831 | B2 | 5/2016 | Burnett et al. | |
| 9,396,750 | B2 | 7/2016 | Chu et al. | |
| 9,569,121 | B1 | 2/2017 | Rausch et al. | |
| 9,607,649 | B1* | 3/2017 | Riddering | G11B 5/607 |
| 9,653,121 | B1 | 5/2017 | Chu et al. | |
| 9,685,182 | B1* | 6/2017 | Granz | G11B 5/607 |
| 9,741,378 | B1 | 8/2017 | Yang | |
| 9,881,641 | B1 | 1/2018 | Canchi et al. | |
| 10,147,454 | B1 | 12/2018 | Mendonsa et al. | |
| 2006/0158769 | A1* | 7/2006 | Ono | G11B 5/60 |
| | | | | 360/75 |
| 2013/0044575 | A1* | 2/2013 | Mori | G11B 5/3133 |
| | | | | 369/13.26 |
| 2013/0286805 | A1* | 10/2013 | MacKen | G11B 5/314 |
| | | | | 369/13.33 |
| 2017/0018284 | A1* | 1/2017 | Lou | G11B 5/6029 |

OTHER PUBLICATIONS

Shaomin Xiong, Robert Smith, Jian Xu, Shuji Nishida, Masaru Furukawa, Kenji Tasaka, Kenji Kuroki, Yeoungchin Yoon, Na Wang, Sripathi Canchi, Erhard Schreck, and Qing Dai, "Setting Write Spacing in Heat Assisted Magnetic Recording," IEEE Transactions on Magnetics, vol. 54, No. 8, Aug. 2018.

* cited by examiner

*Primary Examiner* — Peter Vincent Agustin

(57) ABSTRACT

A data storage device is disclosed comprising a head actuated over a disk, wherein the head comprises a write assist element. Data is written to the disk using the write assist element. A protrusion of the head toward the disk is measured periodically, and an abnormality with the write assist element is detected when a slope of the protrusion measurements indicates the protrusion is increasing.

17 Claims, 5 Drawing Sheets

DATA STORAGE DEVICE DETECTING ABNORMALITY WITH A WRITE ASSIST ELEMENT BASED ON SLOPE OF PROTRUSION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Data is typically written to the disk by modulating a write current in an inductive coil (write coil) to record magnetic transitions onto the disk surface in a process referred to as saturation recording. During read-back, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Microwave assisted magnetic recording (MAMR) is also a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface.

DETAILED DESCRIPTION

Figures 1A, 1B, 1C:
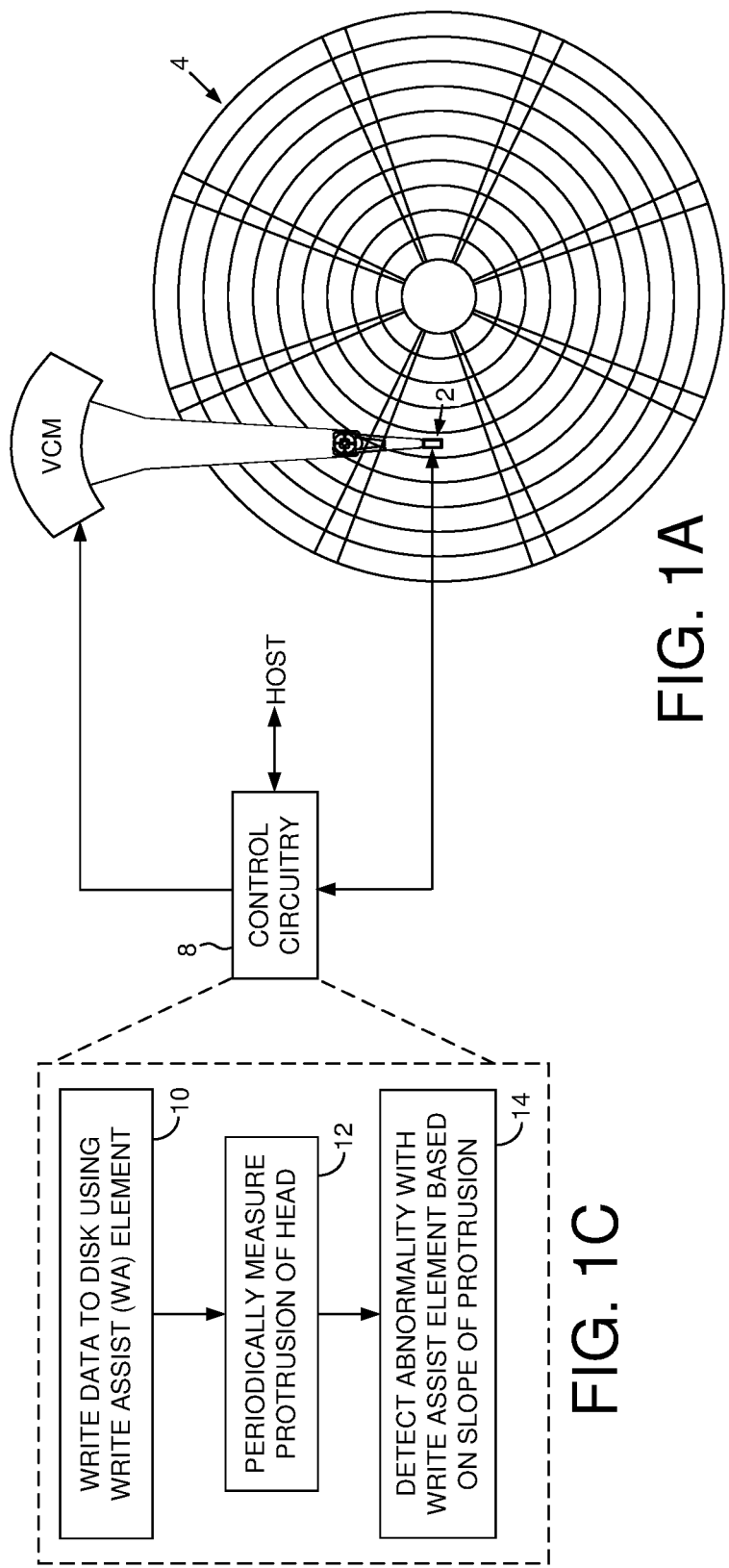
FIG. 1A shows a data storage device in the form of a disk drive according to an embodiment comprising a head actuated over a disk.
FIG. 1B shows a head according to an embodiment comprising a write coil and a write assist element, such as a HAMR laser diode and near field transducer (NFT), or a MAMR STO.
FIG. 1C is a flow diagram according to an embodiment wherein a protrusion of the head is periodically measured, and an abnormality with the write assist element is detected when the slope of the protrusion measurements indicates the protrusion is decreasing.
Figure 2A:
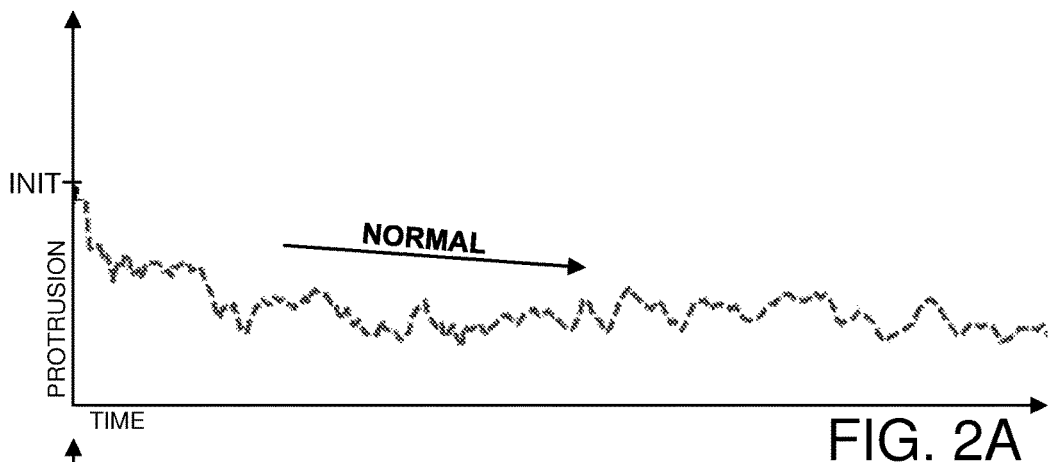
FIGS. 2A-2D show examples wherein the slope of the protrusion measurements is negative which in one embodiment indicates a normality with the write assist element.
Figure 2B:
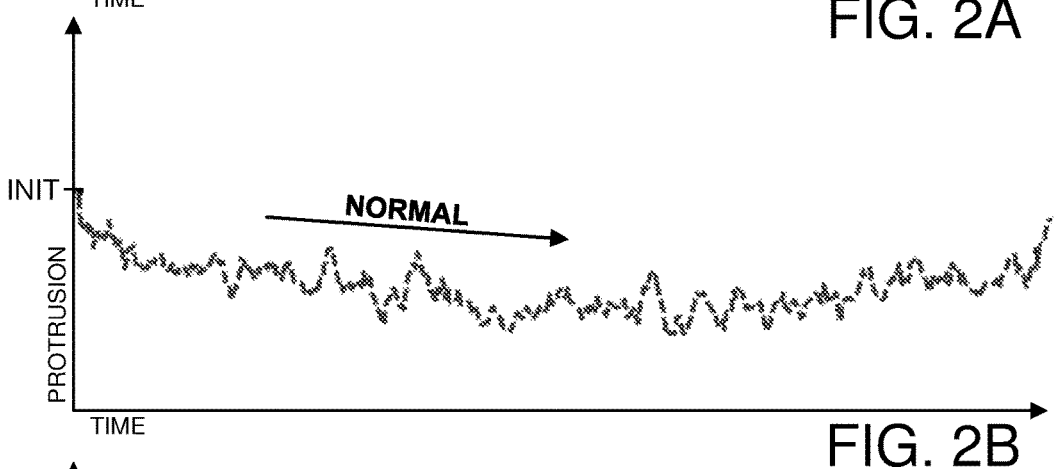
Figure 2C:
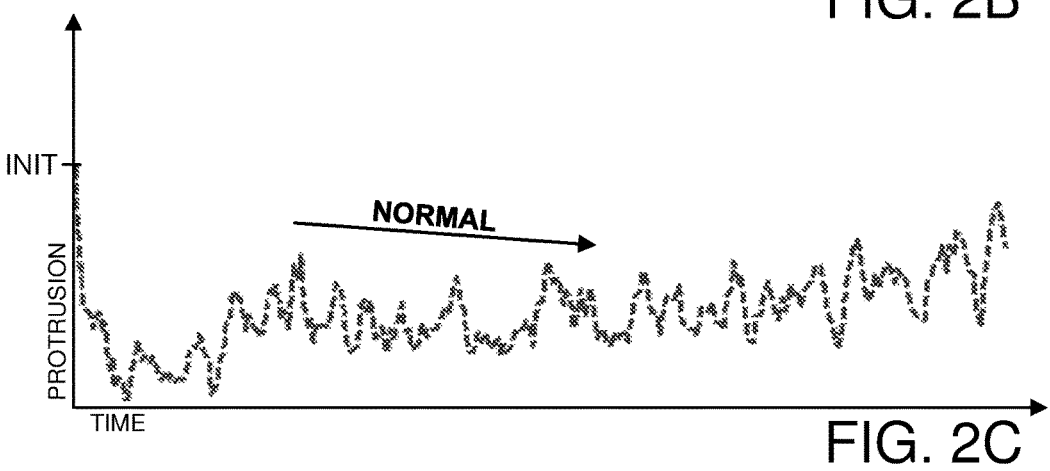
Figure 2D:
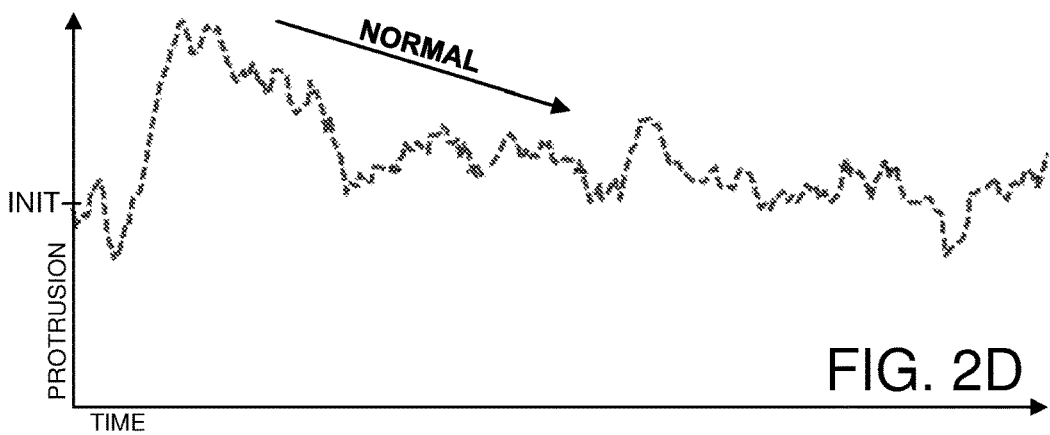

FIG. 1A shows a data storage device in the form of a disk drive according to an embodiment comprising a head 2 actuated over a disk 4, wherein the head comprises a write assist element 6 (FIG. 1B). The disk drive further comprises control circuitry 8 configured to execute the flow diagram of FIG. 1C, wherein data is written to the disk using the write assist element (block 10), and a protrusion of the head toward the disk is periodically measured (block 12). An abnormality with the write assist element is detected when a slope of the protrusion measurements indicates the protrusion is increasing (block 14).

In the embodiment of FIG. 1B, the head 2 comprises a suitable write element such as a write coil 16 configured to write data to the disk 4, and a suitable read element 18 such as a magnetoresistive (MR) element or magnetic tunneling junction (MTJ) element configured to read data from the disk 4. During write operations, the write assist element 6 improves the fidelity of the written data, for example, by heating the surface of the disk 4 in HAMR or by enhancing the magnetic write field in MAMR. The bottom surface of the head 2 facing the disk 4 is referred to as an air bearing surface (ABS) wherein an air bearing forms between the head 2 and the disk surface 4 due to the disk spinning such that the head 2 effectively flies above the disk surface 4. During write/read operations, the fly height of the head 2 above the disk 4 typically impacts the quality of the written data as well as the quality of the read signal when reading the data. In one embodiment, the head 2 may comprise a suitable fly height actuator (e.g., a heating element or piezoelectric element) configured to control the fly height of the head during write/read operations. The fly height of the head 2 during write operations is also affected by the protrusion of at least part of the head 2 toward the disk 4 due to thermal expansion caused by the heating effect of the write coil 16 and the write assist element 6. Accordingly in one embodiment, calibrating the fly height actuator in order to achieve a target fly height during write operations may take into account the protrusion effect of the write coil 16 and write assist element 6.

In one embodiment, the write assist element 6 may wear out over time due, for example, to thermal degradation, and eventually fail altogether. In addition, the life of the write assist element 6 (time until failure) across the heads may vary due to tolerances in materials as well as fabrication process. In one embodiment, this variation in the life of the write assist element 6 may be spread over orders of magnitude, for example, ranging from less than a minute to more than a thousand minutes of useful operation. The inventors have discovered there is a relatively high correlation between the protrusion of the write element 6 toward the disk over time and the propensity of the write element 6 to fail due to an abnormality.

Figure 3A:
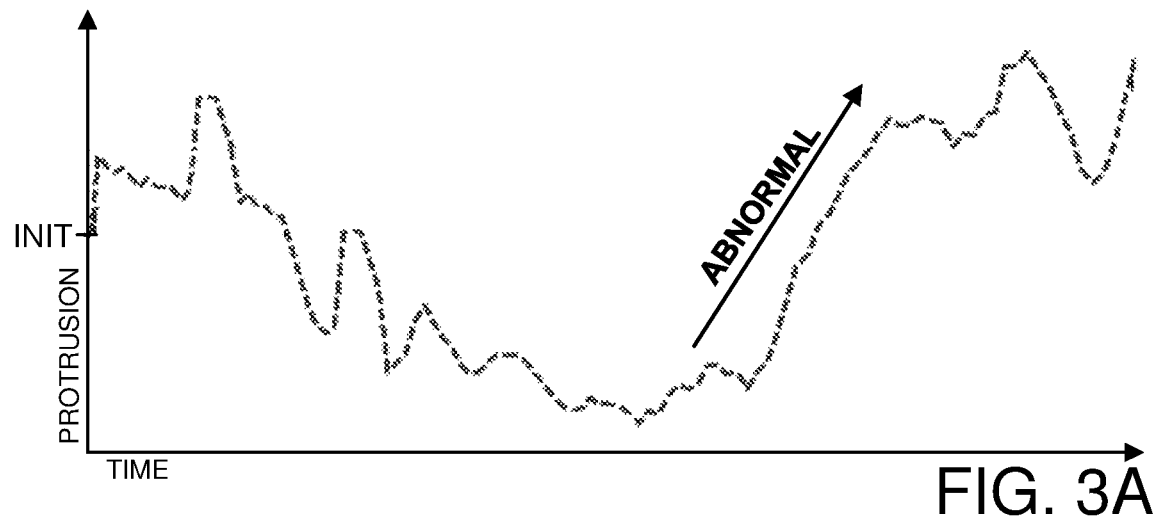
FIGS. 3A-3B show examples wherein the slope of the protrusion measurements is positive which in one embodiment indicates an abnormality with the write assist element.
Figure 3B:
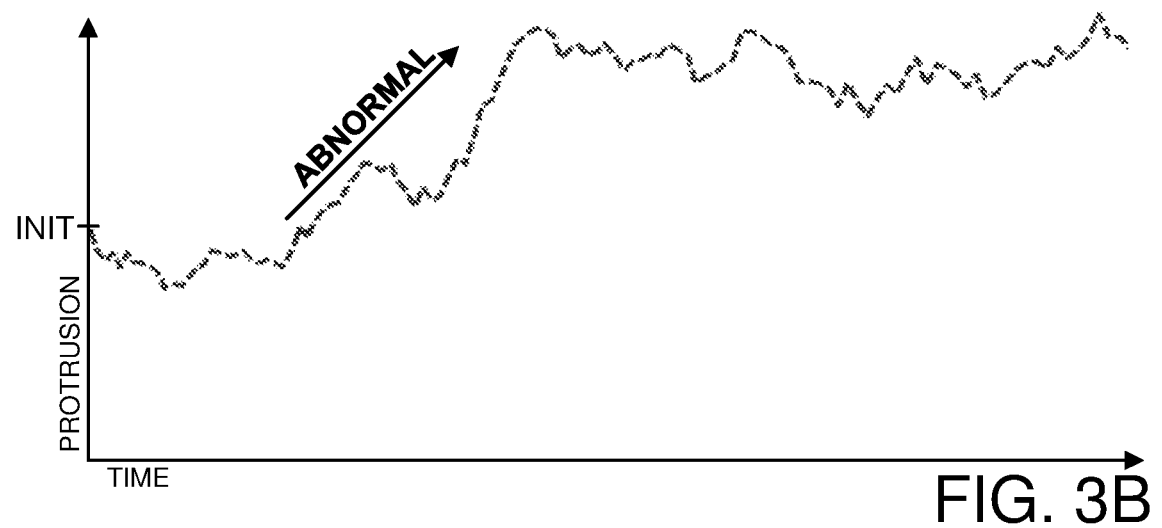

Accordingly in one embodiment, the protrusion of the write assist element is measured periodically over time to detect an abnormality with the write assist element. For example, in one embodiment a constant bias signal is applied to the write assist element (e.g., a constant test current is applied to a laser in a HAMR disk drive) while measuring the resulting head protrusion. A normality with the write assist element may be detected when the slope of the protrusion measurements is negative (meaning the temperature of the write element and the corresponding protrusion are decreasing over time), whereas an abnormality with the write assist element may be detected when a slope of the protrusion measurements is positive (meaning the temperature of the write element and the corresponding protrusion are increasing over time). FIGS. 2A-2D show examples of the protrusion measurements over time for four different write assist elements, wherein the negative slope of the protrusion measurements indicates the write assist element is normal (with a propensity of having a normal time to failure). FIGS. 3A-3B show examples of the protrusion measurements over time for two different write assist elements, wherein the positive slope of the protrusion measurements indicates the write assist element is abnormal (with a propensity of having a short time to failure). In one embodiment, a normality with the write assist element may also be detected when the slope of the protrusion measurements remains substantially flat (indicating the protrusion is substantially constant over time).

In one embodiment, the slope of the protrusion measurements may be generated over a predetermined sliding window of time in order to filter out transients. For example, in one embodiment an abnormality may be detected if the slope of the protrusion measurements are positive on average over a predetermined sliding window of time. In another embodiment, the slope measurements may be low pass filtered in order to filter out transients that may occur over the predetermined sliding window. Referring again to the example of FIG. 2D, the positive slope of the protrusion measurements near the beginning of the lifetime may be filtered out and ignored as a transient outlier.

Referring again to the example of FIG. 3A, in one embodiment a positive slope in the protrusion measurements indicating a propensity for early failure may be detected after the disk drive has been deployed in the field. When an abnormality is detected with the write assist element, the control circuitry 8 may take any suitable action, such as warning the host of an impending head failure. In another embodiment, the control circuitry 8 may take remedial action, for example, by directing future write operations to the disk surfaces with heads having normally operating write assist elements. In yet another embodiment when an abnormality is detected with a write assist element, the control circuitry 8 may designate the corresponding disk surface as a cold storage surface for storing cold data (e.g., write-once data of video files). The control circuitry 8 may then migrate cold data from other disk surfaces to the cold storage surface, or write cold data received from the host to the cold storage surface. In this manner when the write assist element eventually fails, the cold storage surface may be converted to a read-only surface without significantly impacting the capacity of the disk drive.

In another embodiment, the control circuitry 8 may detect an abnormality with the write assist element early during its lifetime such as shown in FIG. 3B so that other remedial actions may be taken. For example, if an abnormality is detected during a manufacturing process of the disk drive, the defective head may be depopulated or replaced before the disk drive is shipped to a customer.

Figure 4:
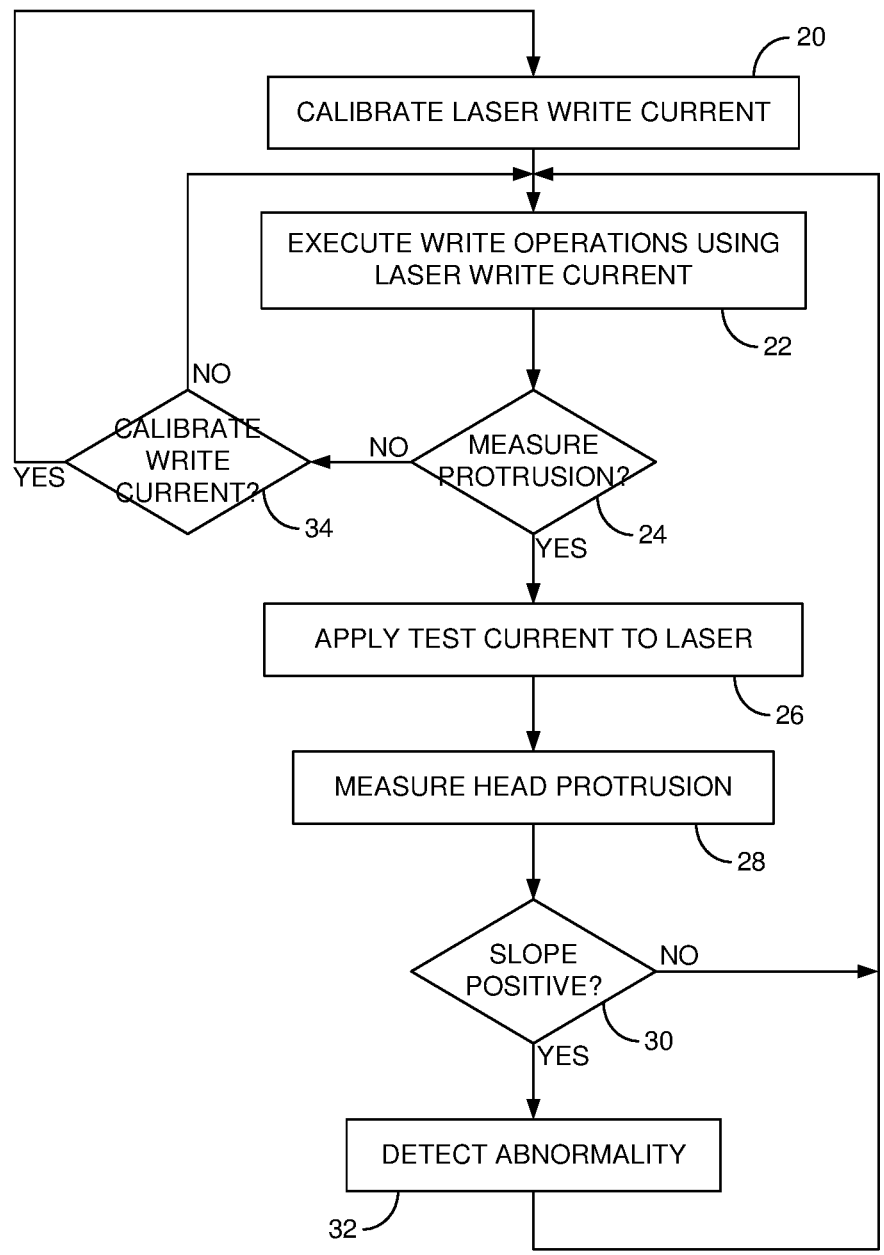
FIG. 4 is a flow diagram according to an embodiment wherein a calibrated write current is applied to the write assist element during write operations, and a non-zero test current is applied to the write assist element when measuring the protrusion.

In an embodiment where the write assist element comprises a laser diode and an NFT in a HAMR disk drive, a calibrated write current may be applied to the laser while writing data to the disk, whereas a constant amplitude, non-zero test current may be applied to the laser during the periodic protrusion measurements of the head. FIG. 4 is a flow diagram showing an example of this embodiment, wherein a write current applied to the laser during write operations is calibrated using any suitable technique (block 20). For example, in one embodiment the amplitude of the write current may be adjusted while writing/reading a test pattern to/from the disk until a suitable quality metric is achieved (e.g., bit error rate, signal-to-noise ratio of the read signal, etc.). The calibrated write current is then applied to the laser during write operations (block 22), and at a predetermined periodic interval, a protrusion measurement procedure is executed (block 24). During the protrusion measurement procedure, a constant amplitude, non-zero test current is applied to the laser (block 26) while measuring the protrusion of the head toward the disk (block 28). In one embodiment, applying the constant amplitude, non-zero test current means that deviations in the protrusion measurement that occur over time are caused mainly by changes in the thermal response of the NFT. When a positive slope in the protrusion measurements is detected (block 30), an abnormality with the NFT is detected (block 32). In one embodiment, the write current applied to the laser may be recalibrated (block 34), for example, at a periodic interval in order to compensate for changes in the laser diode and/or the NFT that adversely affect the quality of the written data.

Figure 5:
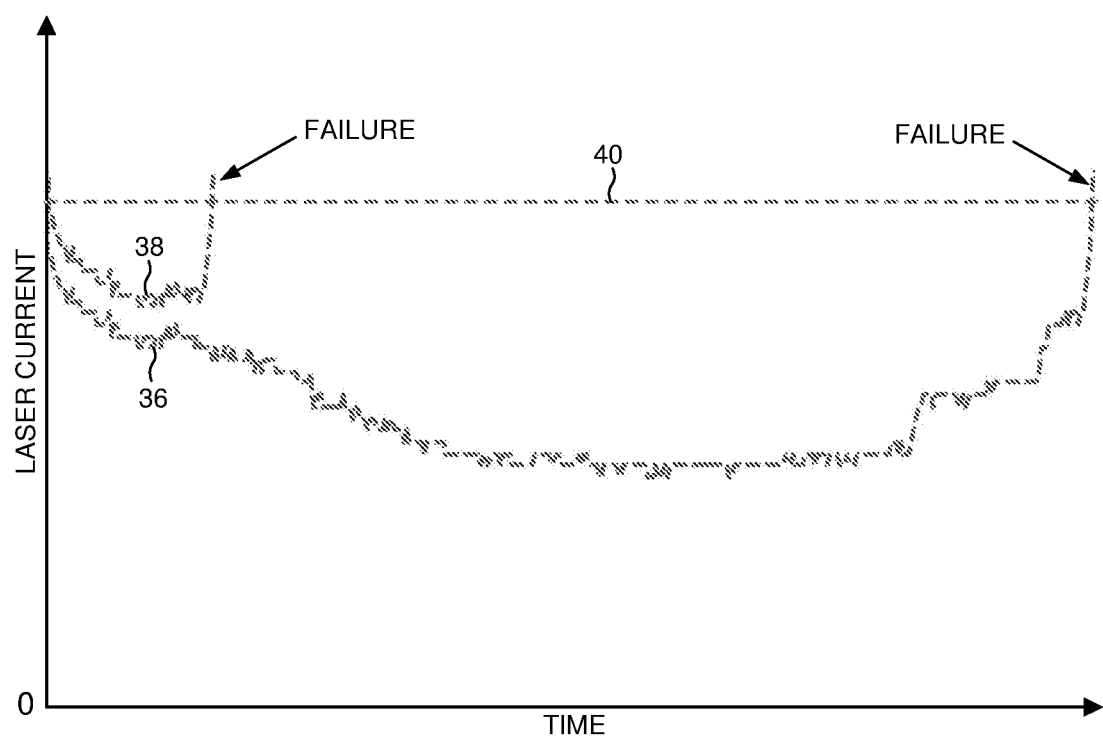
FIG. 5 shows an embodiment wherein a calibrated write current applied to a laser of a HAMR disk drive changes over time as compared to a constant test current applied to the laser when measuring the protrusion of the head.

FIG. 5 shows examples of calibrated write currents applied to the laser diodes of first and second heads over time (laser write current 36 and laser write current 38) as well as a constant amplitude, non-zero test current 40 periodically applied to each laser diode during the protrusion measurement procedure. In this example, the calibrated write current 36 for the first head follows a nominal bathtub curve over the life of the laser diode or NFT, whereas the calibrated write current 38 for the second head exhibits an early abrupt increase due to an early failure of the corresponding NFT. In one embodiment, a positive slope in the protrusion measurements for the second head may be detected prior to the NFT failing, allowing for any suitable remedial action to be taken prior to actually failing.

Any suitable technique may be employed to periodically measure the protrusion of the head toward the disk at block 12 of FIG. 1C. For example, in one embodiment the protrusion of the head may be measured by writing a periodic test pattern to the disk while applying the constant amplitude, non-zero test current to the laser diode in a HAMR disk drive. When the test pattern is read from the disk, an average amplitude of the read signal is measured which correlates with the protrusion of the head. That is, a higher signal amplitude means the head is protruding closer to the disk surface due to the efficacy of the write assist element 6 increasing. In one embodiment, a fly height actuator may adjust a coarse fly height of the head to an initial fly height at the beginning of the protrusion measurement procedure. In one embodiment, the initial fly height as well as the non-zero test current are configured to ensure there is sufficient signal amplitude to detect fly height deviations in the protrusion measurements, while also avoiding head/disk contact. An example embodiment for adjusting the coarse fly height of the head as well as measuring the protrusion of the write assist element is disclosed in U.S. Pat. No. 9,881,641 entitled "BURST WRITING FOR CLEARANCE CALIBRATION IN A HEAT ASSISTED MAGNETIC DATA RECORDING SYSTEM," the disclosure of which is incorporated herein by reference.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head actuated over the disk, wherein the head comprises a write assist element; and
   control circuitry configured to:
      write data to the disk using the write assist element;
      periodically measure a protrusion of the head toward the disk;
      detect an abnormality with the write assist element when a slope of the protrusion measurements indicates the protrusion is increasing;
      apply a write current to the write assist element to write the data to the disk; and
      when measuring the protrusion of the head, apply a non-zero test current to the write assist element, wherein an amplitude of the write current is different than an amplitude of the non-zero test current.

2. The data storage device as recited in claim 1, wherein the write assist element comprises a near field transducer (NFT).

3. The data storage device as recited in claim 2, wherein the write assist element further comprises a laser.

4. The data storage device as recited in claim 1, wherein the control circuitry is further configured to adjust the amplitude of the write current to compensate for changes in the write assist element over time.

5. The data storage device as recited in claim 1, wherein the control circuitry is further configured to detect a normality with the write assist element when the slope of the protrusion measurements indicates the protrusion is decreasing.

6. The data storage device as recited in claim 1, wherein the control circuitry is further configured to detect a normality with the write assist element when the slope of the protrusion measurements indicates the protrusion is remaining substantially constant.

7. A data storage device comprising:
   a disk;
   a head actuated over the disk, wherein the head comprises a write assist element comprising a laser and a near field transducer (NFT); and
   control circuitry configured to:
      apply a write current to the laser to write data to the disk;
      apply a non-zero test current to the laser when measuring a protrusion of the head toward the disk;
      periodically apply the non-zero test current to the laser to measure the protrusion of the head toward the disk; and
      detect an abnormality with the write assist element when a slope of the protrusion measurements indicates the protrusion is increasing.

8. The data storage device as recited in claim 7, wherein an amplitude of the write current is different than an amplitude of the non-zero test current.

9. The data storage device as recited in claim 7, wherein the control circuitry is further configured to periodically adjust an amplitude of the write current to compensate for changes in the write assist element over time.

10. The data storage device as recited in claim 7, wherein the control circuitry is further configured to detect a normality with the write assist element when the slope of the protrusion measurements indicates the protrusion is decreasing.

11. The data storage device as recited in claim 7, wherein the control circuitry is further configured to detect a normality with the write assist element when the slope of the protrusion measurements indicates the protrusion is remaining substantially constant.

12. A data storage device comprising:
- a disk;
- a head actuated over the disk, wherein the head comprises a write assist element;
- a means for writing data to the disk using the write assist element;
- a means for periodically measuring a protrusion of the head toward the disk; and
- a means for detecting an abnormality with the write assist element when a slope of the protrusion measurements indicates the protrusion is increasing, wherein:
  - the means for writing data comprises a means for applying a write current to the write assist element to write the data to the disk; and
  - the means for measuring the protrusion of the head comprises a means for applying a non-zero test current to the write assist element, wherein an amplitude of the write current is different than an amplitude of the non-zero test current.

13. The data storage device as recited in claim 12, wherein the write assist element comprises a near field transducer (NFT).

14. The data storage device as recited in claim 13, wherein the write assist element comprises a laser.

15. The data storage device as recited in claim 12, further comprising a means for periodically adjusting the amplitude of the write current to compensate for changes in the write assist element over time.

16. The data storage device as recited in claim 12, wherein a normality with the write assist element is detected when the slope of the protrusion measurements indicates the protrusion is decreasing.

17. The data storage device as recited in claim 12, wherein a normality with the write assist element is detected when the slope of the protrusion measurements indicates the protrusion is remaining substantially constant.

\* \* \* \* \*